(12) United States Patent
Larocque et al.

(10) Patent No.: US 8,022,862 B2
(45) Date of Patent: Sep. 20, 2011

(54) PROCESSING OF PULSE-ECHO MEASUREMENT SIGNALS

(75) Inventors: Jean-René Larocque, Peterborough (CA); Derek Yee, Hamilton (CA)

(73) Assignee: Siemens Milltronics Process Instruments, Inc., Ontario (CA)

( * ) Notice: Subject to any disclaimer, the term of this patent is extended or adjusted under 35 U.S.C. 154(b) by 152 days.

(21) Appl. No.: 12/507,211

(22) Filed: Jul. 22, 2009

(65) Prior Publication Data

US 2010/0019949 A1    Jan. 28, 2010

(30) Foreign Application Priority Data

Jul. 22, 2008  (EP) ..................................... 08013174

(51) Int. Cl.
   *G01S 13/18* (2006.01)
(52) U.S. Cl. ............ 342/94; 342/95; 342/115; 342/124
(58) Field of Classification Search .............. 342/94–97, 342/114–115, 118, 124, 159, 162, 195
   See application file for complete search history.

(56) References Cited

U.S. PATENT DOCUMENTS

| | | | |
|---|---|---|---|
| 5,321,406 A * | 6/1994 | Bishop et al. .................... | 342/32 |
| 5,374,932 A * | 12/1994 | Wyschogrod et al. .......... | 342/36 |
| 5,519,618 A * | 5/1996 | Kastner et al. ................ | 701/120 |
| 5,969,666 A | 10/1999 | Burger et al. | |
| 7,073,379 B2 | 7/2006 | Schroth et al. | |
| 7,376,047 B2 * | 5/2008 | Brown et al. .................... | 367/98 |
| 7,420,877 B2 * | 9/2008 | Hosseini et al. ................ | 367/99 |
| 2003/0081502 A1 | 5/2003 | Welke | |
| 2005/0066732 A1 * | 3/2005 | Daigle ............................ | 73/615 |
| 2005/0072226 A1 | 4/2005 | Pappas et al. | |
| 2007/0201309 A1 * | 8/2007 | Brown et al. .................... | 367/98 |
| 2008/0101158 A1 * | 5/2008 | Hosseini et al. ................ | 367/87 |
| 2010/0019949 A1 * | 1/2010 | Larocque et al. ............... | 342/94 |

FOREIGN PATENT DOCUMENTS

WO    WO 2006/068604 A1    6/2006

OTHER PUBLICATIONS

Leung et al., "Evaluation of Multiple Radar Target Trackers in Stressful Environments", IEEE Transactions on Aerospace and Electronic Systems, Apr. 1999, pp. 663-674, vol. 35, No. 2.
Sai, "High Precision Self-Adaptive Radar Gauging under Clutter Environments", Proceedings of the $3^{rd}$ European Radar Conference, Sep. 2006, pp. 21-24, Manchester, UK.
Blackman, "Multiple-Target Tracking with Radar Applications", Norwood, MA, Artech House, 1986.
Bar-Shalome et al, Tracking and Data Association, san Diego, CA, Academic Press, 1988.

* cited by examiner

*Primary Examiner* — John B Sotomayor

(57) ABSTRACT

Pulse echo signals containing false echoes are processed by forming tracks of multiple received echoes and monitoring these tracks by a recursive filter such as a Kalman filter. A track velocity is estimated for each track, and the position of each the next echo on the track is predicted.

20 Claims, 4 Drawing Sheets

PROCESSING OF PULSE-ECHO MEASUREMENT SIGNALS

CROSS REFERENCE TO RELATED APPLICATIONS

This application claims priority of European Patent Office Application No. 08013174.1 EP filed Jul. 22, 2008, which is incorporated by reference herein in its entirety.

FIELD OF INVENTION

This invention relates to signal processing in pulse-echo measurement system such as level measuring systems. The invention will be particularly described with reference to measuring the level of flowable materials within a container by microwave pulse-echo techniques, but is equally applicable to other contexts such as acoustic pulse-echo measurement.

BACKGROUND OF INVENTION

In systems of this nature, the echo profile typically contains a number of false echoes arising from obstacles, reflections and the like. It is well known to provide signal processing which discriminates between these and the true measurement echo. Many systems make use of a time-varying threshold (TVT). The echo of the material sometimes dips below the TVT causing the device to select another echo and potentially go into loss of echo state. There are also instances where an unwanted echo rises above the TVT, causing the device to lock onto that echo and produce incorrect readings.

Up to now, the echo has been tracked by a simple discrimination window: the next echo must fall within the window to be accepted. The window is centred on the position of the current echo, and has its width adjusted based on historical knowledge. The window is initially narrow, and an echo within the window is selected. When no echoes are found within the present window, the size of the window is increased until an echo falls within it.

Unwanted echoes are eliminated from the selection process by the TVT curve. At commissioning, the TVT is shaped around the known fixed obstacles. Once the commissioning is complete, the device no longer has any means to discriminate for obstacles. If the level of an echo from an obstacle rises above the TVT, then the device will lock onto it when the level of the material is below the level of the obstacle. This can be a significant problem, which the present invention seeks to overcome or mitigate.

REFERENCES

[1] H Leung, Z Hu, and M Blanchette, "Evaluation of multiple radar target trackers in stressful environments", IEEE Transactions on Aerospace and Electronic Systems, vol 35, pp 663-674, April 1999.
[2] S S Blackman, "Multiple-Target Tracking with Radar Applications", Norwood, M A, Artech House, 1986
[3] Y Bar-Shalom and T E Fortmann, "Tracking and Data Association", San Diego, Calif., Academic Press, 1988.

SUMMARY OF INVENTION

The invention provides a method of processing echo signals in a pulse-echo measurement system where obstacles are likely to cause false echoes, the method comprising:

forming tracks of multiple received echoes;
using a recursive filter, such as a Kalman filter, to monitor each track by estimating a track velocity and predicting the position of the next echo;
selecting one echo from the multiple echoes received at any given time by selecting the echo on that track which has a non-null velocity and is closest to the transmitter or, if all tracks have a null velocity, that which is closest to the transmitter.

This enables the moving target to be identified amongst the clutter of echoes from obstacles.

A track may conveniently be initiated when a set of three points have a similar velocity. Optionally, it is also advantageous that said track is not initiated if the set of three points have accelerations which differ by more than a predetermined amount.

Preferably a track is deleted when no measurement update has occurred on that track for a predetermined period of time. This reduces the amount of data to be handled.

Preferably also each track is updated by a gating procedure, using a gate of predetermined width centered on a predicted track position, this again being an efficient means of maintaining the track.

In order to further simplify data processing, the method preferably includes discriminating between multiple candidates on a single track by use of a nearest neighbour procedure, which most conveniently comprises forming an assignment matrix, and applying to the assignment matrix a suboptimal solution comprising the steps:

(1) Search the assignment matrix for the closest (minimum distance) measurement-to-track pair and make the indicated assignment.
(2) Remove the measurement-to-track pair identified above from the assignment matrix and repeat Rule 1 for the reduced matrix.

The method of the present invention is preferably carried out in software. Accordingly, the present invention also provides a computer program with a computer readable program code for carrying out the foregoing method, and a computer program product (such as a storage medium) for implementing the method, when the program code is run on a computer.

The invention also provides a pulse-echo measurement system including signal processing means, the signal processing means being operable to discriminate against false echoes caused by obstructions by carrying out the foregoing method. The signal processing means preferably comprises computer program storage means comprising the foregoing computer program.

BRIEF DESCRIPTION OF THE DRAWINGS

An embodiment of the invention will now be described, by way of example only, with reference to the drawings, in which.

DETAILED DESCRIPTION OF INVENTION

Figure 1:
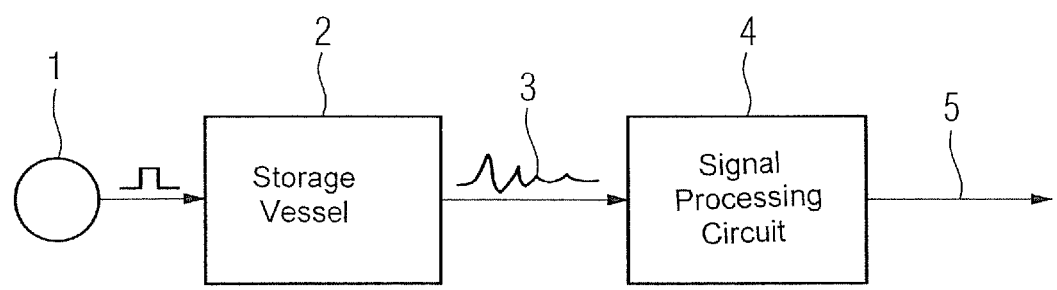
FIG. 1 is a schematic block diagram of a pulse-echo measurement system.

Referring to FIG. 1, a radar or ultrasonic transmitter 1 transmits an interrogating pulse into a storage vessel 2. A captured echo signal 3 is applied to a signal processing circuit 4 as an example of signal processing means in which the echo signal is digitised and processed as will now be described.

The invention is based on a recursive filter such as a Kalman filter to track all echoes above the TVT, and even some echoes, specially selected that may fall below the TVT. Each echo constitutes a track and each track is monitored by a Kalman filter. For each track the method estimates the velocity and predicts the position of the next echo.

In cases where a fixed obstacle would rise above the TVT, a null velocity is assigned to that track and that echo is not selected if there is another track that has a non-null velocity. In other words, the method prefers to pick a moving echo rather than a stationary echo.

Track Initialization and Track Deletion

The method has the ability to add tracks when a new echo is detected, and the ability to delete tracks when there is no echo in the expected area of the profile.

A track is initialized when a set of three points jointly satisfy the velocity test and the acceleration test. The velocity test focuses the associations of points that have a similar velocity, and a smaller acceleration. The acceleration test prevents the association of a point to a track that would be too far. The velocity test initializes tentative tracks while the acceleration test confirms them. The criteria for velocity and acceleration can be adjusted for each application types.

The following example illustrates the track initialization process.

In each of FIGS. 2-4 and 6 there is shown a series of snapshots taken at time intervals k, with each measurement made in any snapshot being denoted by the symbol *.

Figure 2:
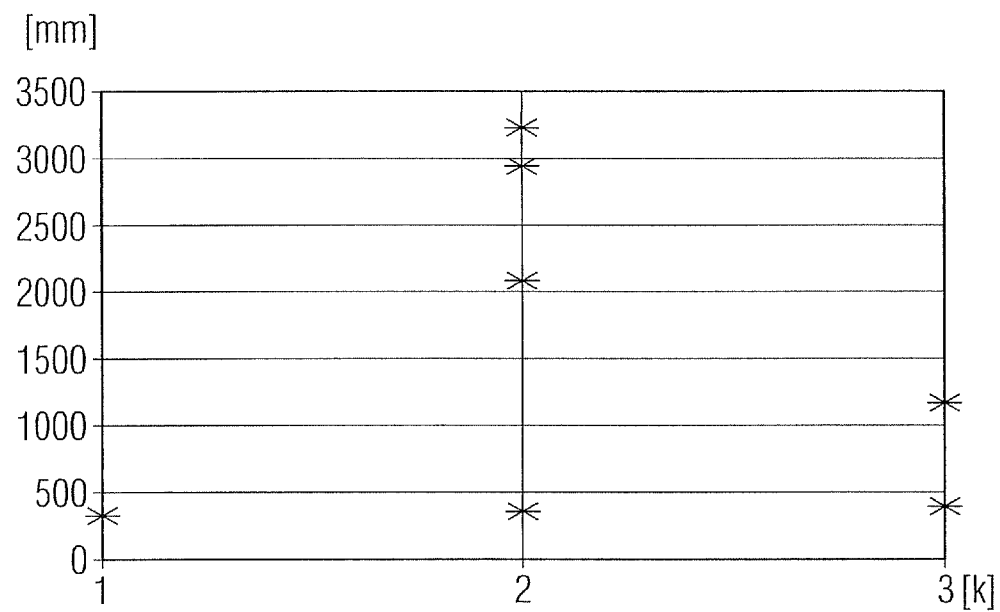
FIG. 2 is a graphical representation of a sequence of measurements in such a system, where multiple echoes are present at times.

FIG. 2 shows a series of snapshots of detected echoes taken at time intervals k. The sequence of measurements depicted in FIG. 2 is given in Table 1.

TABLE 1

|  | k = 1 | k = 2 | k = 3 |
|---|---|---|---|
| $y_k^1$ | 310.01 | 3173.8 | 1115.9 |
| $y_k^2$ | N/A | 2885.9 | 353.2 |
| $y_k^3$ | N/A | 2036.9 | N/A |
| $y_k^4$ | N/A | 324.4 | N/A |
| m(k) | 1 | 4 | 2 |

The following steps are then carried out.

1. Conduct the velocity test for each pair of (unassociated) measurement in snapshot k−1 and snapshot k−2. That is, $$v_{min} \le \left\| \frac{(y_{k-1}^j - y_{k-2}^i)}{T_{k-1}} \right\| \le v_{max} \quad (1)$$

where $0 \le v_{min}$ and $0 \le v_{max} \le v_{max}$. Pairs with velocities greater than $v_{min}$ but less than $v_{max}$ are declared as tentative tracks. If k=3 and $T_2$=1 sec. in FIG. 2, one would compute (see Table 1)

$$\left\| \frac{(y_2^1 - y_1^1)}{T_2} \right\| = \left\| \frac{3173.8 - 310.01}{1} \right\| = 2863.8 \text{ mm/sec.} \quad (2)$$

$$\left\| \frac{(y_2^2 - y_1^1)}{T_2} \right\| = \left\| \frac{2885.9 - 310.01}{1} \right\| = 2575.9 \text{ mm/sec.}$$

$$\left\| \frac{(y_2^3 - y_1^1)}{T_2} \right\| = \left\| \frac{2036.9 - 310.01}{1} \right\| = 1726.9 \text{ mm/sec.} \quad (3)$$

$$\left\| \frac{(y_2^4 - y_1^1)}{T_2} \right\| = \left\| \frac{324.4 - 310.01}{1} \right\| = 14.4 \text{ mm/sec.}$$

if $v_{min}$=0 mm/sec. and $v_{max}$=20 mm/sec., $(y_1^1, y_2^4)$ would be the only pair of measurements satisfying equation (1). Hence, it would be the only pair of measurements that form a tentative track.

2. For every tentative track consisting of two measurements, perform track confirmation via an acceleration test with $\{y_k^n\}_{n=1}^{m(k)} = \{y_k^1, \ldots, y_k^{m(k)}\}$ That is, $$\left\| \left( \frac{(y_k^n - \tilde{y}_{k-1}^j)}{T_k} - \frac{(\tilde{y}_{k-1}^j - \tilde{y}_{k-2}^i)}{T_{k-1}} \right) \right\| \le T_k a_{max} \quad (4)$$

where "~" indicates the tentative track obtained in the previous test. For FIG. 2 assuming $T_3$=1 sec., one would compute (see Table 1)

$$\left\| \left( \frac{(y_3^1 - \tilde{y}_2^4)}{T_3} - \frac{(\tilde{y}_2^4 - \tilde{y}_1^1)}{T_2} \right) \right\| = \left\| \frac{1115.9 - 324.4}{1} - 14.4 \right\|$$
$$= 777.1 \text{ mm/sec}^2$$

$$\left\| \left( \frac{(y_3^2 - \tilde{y}_2^4)}{T_3} - \frac{(\tilde{y}_2^4 - \tilde{y}_1^1)}{T_2} \right) \right\| = \left\| \frac{353.2 - 324.4}{1} - 14.4 \right\|$$
$$= 14.4 \text{ mm/sec}^2$$

if $a_{max}$=20 mm/sec$^2$, $(y_1^1, y_2^4, y_3^2)$ would be the final confirmed track.

We stress that measurements not associated with any track, and those unused from previous tests, are used to search for new potential tracks as outlined above. So it should be understood that the initiation procedure is applied in a sliding window to the set of unassociated measurements.

Track Maintenance

Figure 3:
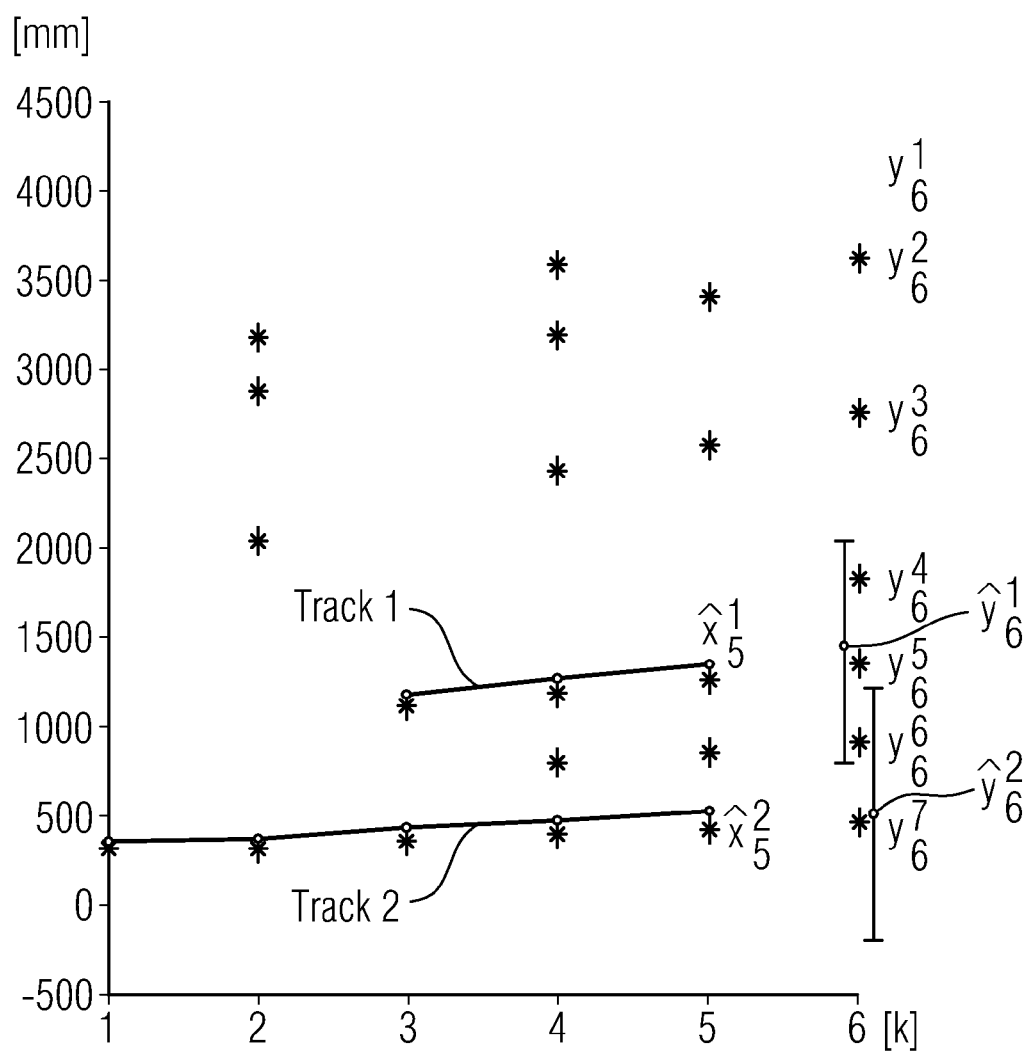
FIG. 3 is a similar representation illustrating measurements being assigned to tracks.

FIG. 3 shows a typical sequence of measurements to illustrate a procedure of track maintenance.

To set the stage for a detailed discussion, assume that N tracks have been formed by the previous snapshot. Now, at snapshot k, we receive a new set of measurements $\{y_k^n\}_{n=1}^{m(k)}$ to update established tracks. The immediate question of interest is this: what are the measurements we use to update each track? In multi-target tracking systems, this is the so-called "data association" problem. The classical answer is to use "gating" and an appropriate solution to the assignment matrix problem [2].

For an illustration, see FIG. 3 where there are seven measurements $\{y_6^n\}_{n=1}^7$ at snapshot 6, but only two established tracks at snapshot 5.

Gating

Gating is a technique which reduces the number of candidate measurements for an established track. At snapshot k, we construct for each target a gate in the region where the measurement is expected to lie. The gate is centered at the predicted measurement $\hat{y}y_n^j$, and only those measurements lying within this gate are considered for track update. Defining $d_k^{j,i}$ to be the distance function for associating measurement $y_k^i$ to track j at snapshot k, the gating test can be written as $$d_k^{j,i} = \frac{(y_k^i - \hat{y}_k^j)^2}{S_k^j} \leq \gamma \qquad (5)$$

where $\hat{y}_k^j$ is the predicted measurement for track j, $S_k^j$ is the average MSE (mean square error) for estimate $\hat{y}_k^j$, and $\gamma$ is a number generally chosen between 16 and 25 [1, 2, 3]. If $d_k^{j,i} \leq \gamma$, $y_k^j$ is a candidate measurement for track j. Conversely, if $d_k^{j,i} \geq \gamma$, $y_k^i$ is not a candidate measurement for track j. If a measurement is not associated with any track, then we call it an unassociated measurement. As discussed in the previous section, all unassociated measurements are considered for track initiation.

A track could have multiple candidate measurements. An additional procedure must be carried out to assign a measurement $y_k^i$ to a particular track. Traditionally, there are two approaches to solve this problem. They are "nearest-neighbour" (NN) approach and the "all-neighbour" approach. The NN approach is less computationally demanding than the all-neighbour approach. For multi-target tracking in limited clutter, it represents a good tradeoff between complexity and performance [1]. For this reason, we use a nearest neighbour (NN) approach to assign a measurement $y_k^i$ to a particular track.

Suboptimal Solution to the Data Association Matrix Problem

The NN approach is based on a solution to the assignment matrix problem. In general, the assignment matrix, for N established tracks and m(k) measurements at snapshot k, is given by Table 2.

TABLE 2

| Meas. Tracks | $y_k^1$ | $y_k^2$ | ... | $y_k^{m(k)-1}$ | $y_k^{m(k)}$ |
|---|---|---|---|---|---|
| Track 1 | $d_k^{1,1}$ | $d_k^{1,2}$ | ... | $d_k^{1,m(k)-1}$ | $d_k^{1,m(k)}$ |
| Track 2 | $d_k^{2,1}$ | $d_k^{2,2}$ | ... | $d_k^{2,m(k)-1}$ | $d_k^{2,m(k)}$ |
| . | . | . | . | . | . |
| . | . | . | . | . | . |
| . | . | . | . | . | . |
| Track N − 1 | $d_k^{N-1,1}$ | $d_k^{N-1,2}$ | ... | $d_k^{N-1,m(k)-1}$ | $d_k^{N-1,m(k)}$ |
| Track N | $d_k^{N,1}$ | $d_k^{N,2}$ | ... | $d_k^{N,m(k)-1}$ | $d_k^{N,m(k)}$ |

The desired (optimal) NN solution to the assignment matrix problem is one that maximizes the number of measurement-to-track pairing, while minimizing the total summed distances [2].

For very small N and m(k), we can find the optimal solution through simple enumeration. But for N significantly greater than 1 and m(k) significantly greater than 1, simple enumeration is far too time consuming to find the optimal solution. For this reason, researchers have suggested the use of Munkres algorithm to find the optimal solution [1,2].

Munkres algorithm is an efficient algorithm, but the required computational demands may still preclude its implementation on a dedicated DSP processor. In response to this, several suboptimal algorithms have been proposed in the literature. They do not guarantee optimality of the solution, but they are computationally attractive, and appealing to intuition. For scenarios with limited clutter, they often yield solutions that are often close to the optimal solution. The rules for one such suboptimal solution are shown below [1,2].

Suboptimal Solution to the Assignment Matrix Problem

Search the assignment matrix for the closest (minimum distance) measurement-to-track pair and make the indicated assignment.

Remove the measurement-to-track pair identified above from the assignment matrix and repeat Rule 1 for the reduced matrix.

In the following, we will adopt this approach to solve the assignment matrix problem. For this reason, we have effectively proposed an implementation of the NN filter.

Example of Gating and the Suboptimal Solution to the Assignment Matrix Problem

For the scenario depicted in FIG. 3, we can at k=6, choose between seven measurements $\{y_6^n\}_{n=1}^7$ to update the tracks. To reduce the number of candidate measurements for each track, we must first calculate (5) for all $y_6^n$. Evidently, $y_6^1$, $y_6^2$, and $y_6^3$ will not satisfy the gating test for either tracks, i.e., $d_6^{1,i} \geq \gamma$ and $d_6^{2,i} \geq \gamma$ for i=1, 2, 3. To reflect this outcome, we assign $\infty$ to their associated distance functions. That is, $$d_6^{1,i} = \infty \qquad (6)$$

$$d_6^{2,i} = \infty \qquad (7)$$

for i=1, 2, 3. For the remaining measurements which satisfy at least one of the gates specified by (5), we assume the following hypothetical values for $$d_6^{1,4} = 2.2 \quad d_6^{2,4} = \infty \qquad (8)$$

$$d_6^{1,5} = 1 \quad d_6^{2,5} = \infty \qquad (9)$$

$$d_6^{1,6} = 2 \quad d_6^{2,6} = 1.5 \qquad (10)$$

$$d_6^{1,7} = \infty \quad d_6^{2,7} = 0.5 \qquad (11)$$

Then, according to Table 2, the corresponding data association matrix can be written as

| Meas. Tracks | $y_6^1$ | $y_6^2$ | $y_6^3$ | $y_6^4$ | $y_6^5$ | $y_6^6$ | $y_6^7$ |
|---|---|---|---|---|---|---|---|
| Track 1 | ∞ | ∞ | ∞ | 2.2 | 1 | 2 | ∞ |
| Track 2 | ∞ | ∞ | ∞ | ∞ | ∞ | 1.5 | 0.5 |

For data association (see suboptimal solution), $y_6^7$ is first assigned to track 2, then $y_6^5$ is assigned to track 1, but $y_6^4$ and $y_6^6$ are left without any assignment. Thus, $y_6^4$ and $y_6^6$ are both unassociated measurements.

Finally, we stress that the NN filter finds a unique pairing for each track. At most, one measurement can be used to update each track. With a measurement assigned to a particular track, we run the standard Kalman filter update equations to update that track.

Track Deletion

Tracks with no measurement updates are deleted. If the gate of track j is empty for $N_{del}$ consecutive snapshots, track j is deleted. In this work, we choose $N_{del}=1$, so that we may minimize the complexity of the algorithm.

We can add robustness to the track deletion to delay the deletion after m consecutive gates come up empty.

Also, we can look for echoes that would have fallen below the TVT but that are within the gate. This would add significant robustness to echo level that may dip just below the TVT.

Example

An example of the invention in the form of an experimental filling and emptying of a tank will now be described.

Figure 4:
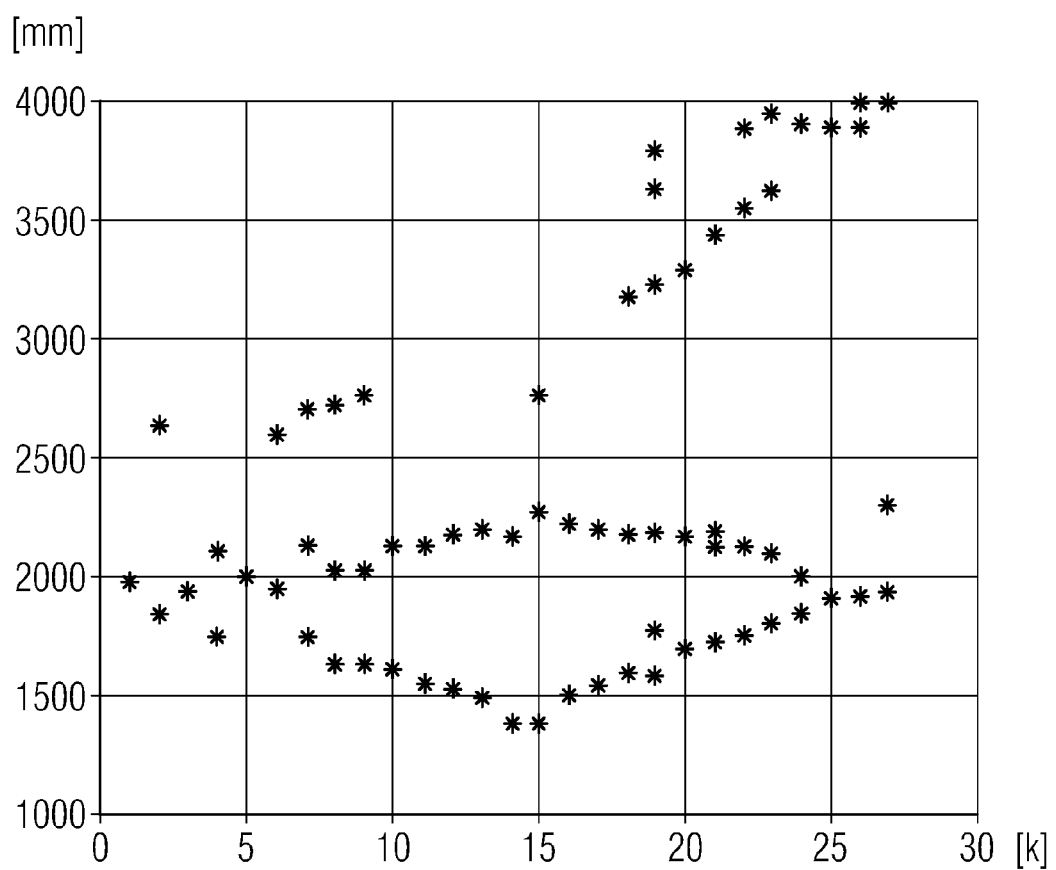
FIG. 4 represents results obtained in an experiment in which a tank is filled and emptied.
Figure 5:
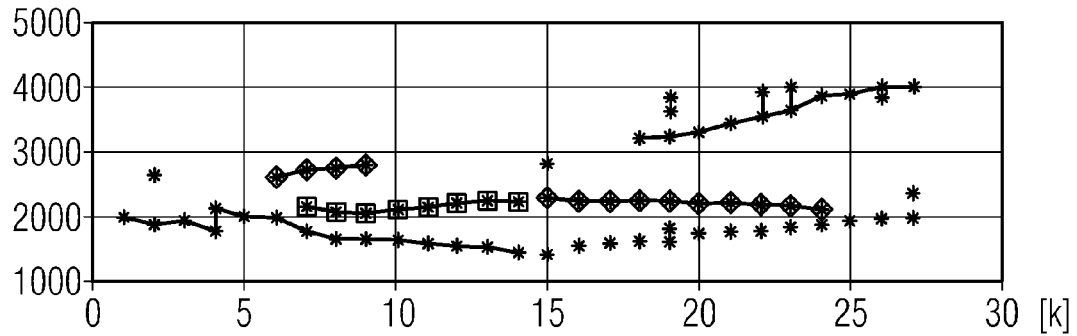
FIG. 5 and FIG. 6 show filter estimates of the position and velocity, respectively, of the measurements of FIG. 4.
Figure 6:
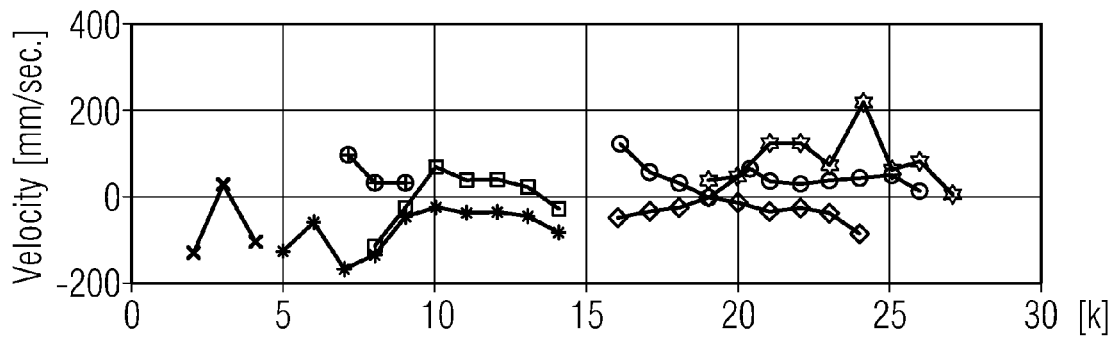

A tank containing obstructions was filled with kerosene and emptied. FIG. 4 shows the resulting sequence of measured echo profile. FIG. 5 shows the position and velocity estimates of the peaks of the measured echo profiles. Velocity estimates are based on sampling interval of $T_k=1$ sec.

Figure 7:
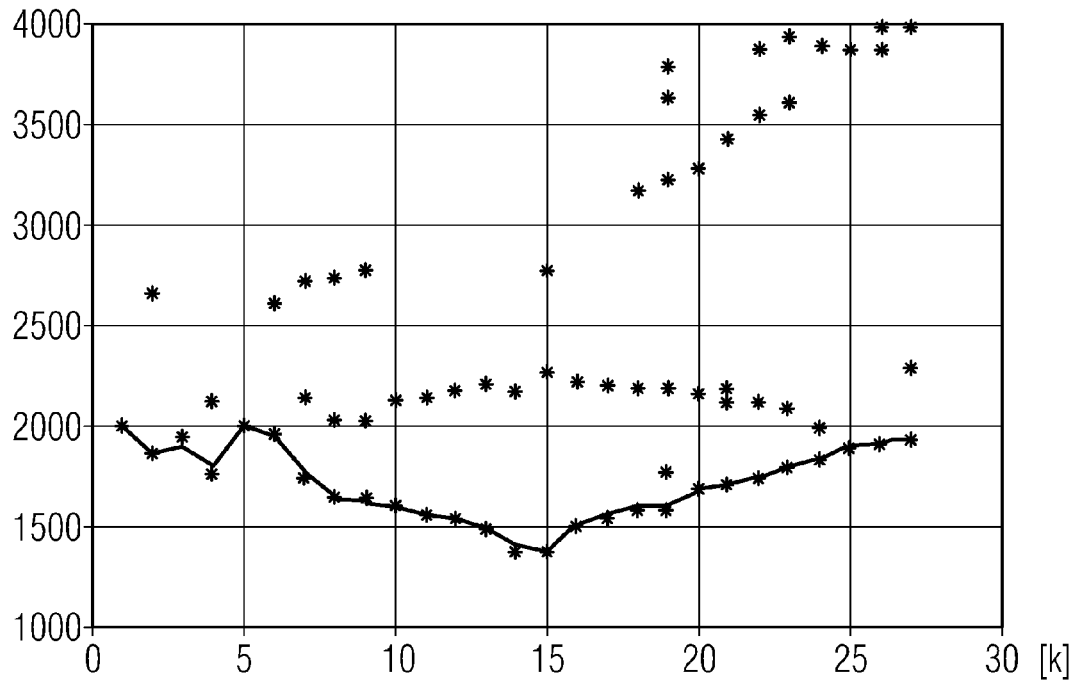
FIG. 7 shows the selection of echoes from the results of FIG. 4.

FIG. 7 shows the selected echo for the sequence of measured echo profiles, the selected echo being shown by a solid line.

Clearly, the NN filter accurately estimates the position and the velocity of the peaks of the measured echo profile. The echo for the pending TOF (time of flight) calculation is also correctly chosen.

Modifications may be made to the foregoing embodiment. Instead of using a Kalman filter, other forms of recursive filter may be used. Other procedures may be used for initiating, maintaining and deleting tracks; for example, techniques other than nearest neighbour and gating may be sued for assigning echoes to tracks.

The main advantage of the invention is to be able to identify the moving target amongst the clutter of echoes from obstacles. The device becomes immune to echoes from obstacles that may rise above the TVT. Furthermore, the device will not lose an echo that may fall below the detection threshold, or even below the TVT.

The invention claimed is:

1. A method of processing echo signals in a pulse-echo measurement system where obstacles are likely to cause false echoes, comprising:
    forming tracks of multiple received echoes;
    using a recursive filter to monitor each track by estimating a track velocity and predicting the position of the next echo; and
    selecting one echo from the multiple echoes received at any given time by selecting the echo on that track which has a non-null velocity and is closest to a transmitter of an interrogating pulse causing the received echoes.

2. The method as claimed in claim 1, wherein, when all tracks have a null velocity, the track closest to the transmitter is selected.

3. The method as claimed in claim 1, wherein the recursive filter is a Kalman filter.

4. The method as claimed in claim 1, wherein a track is initiated when a set of three points have a similar velocity.

5. The method as claimed in claim 4, wherein the track is not initiated when the set of three points have accelerations which differ by more than a predetermined amount.

6. The method as claimed in claim 1, wherein a track is deleted when no measurement update has occurred on that track for a predetermined period of time.

7. The method as claimed in claim 1, wherein a track is updated between an initiation and a deletion by a gating procedure using a gate including a width centered on a predicted track position, the gate width being based on an estimated error for that track.

8. The method as claimed in claim 7, further comprising:
    discriminating between multiple candidate measurements on a single track by using a nearest neighbour procedure.

9. The method as claimed in claim 8, wherein the nearest neighbour procedure comprises forming an assignment matrix, and applying to the assignment matrix a suboptimal solution, comprising:
    searching the assignment matrix for the closest (minimum distance) measurement-to-track pair and make the indicated assignment, resulting in a reduced matrix;
    removing the measurement-to-track pair identified above from the assignment matrix; and
    searching the reduced matrix for the closest (minimum distance) measurement-to-track pair and make the indicated assignment.

10. A computer readable medium storing a computer program code for implementing a method of processing echo signals in a pulse-echo measurement system, where obstacles are likely to cause false echoes, when the computer program is run on a computer, the method comprising:
    forming tracks of multiple received echoes;
    using a recursive filter to monitor each track by estimating a track velocity and predicting the position of the next echo; and
    selecting one echo from the multiple echoes received at any given time by selecting the echo on that track which has a non-null velocity and is closest to a transmitter of an interrogating pulse causing the received echoes.

11. The computer readable medium as claimed in claim 10, wherein, when all tracks have a null velocity, the track closest to the transmitter is selected.

12. The computer readable medium as claimed in claim 10, wherein the recursive filter is a Kalman filter.

13. The computer readable medium as claimed in claim 10, wherein a track is initiated when a set of three points have a similar velocity.

14. The computer readable medium as claimed in claim 10, wherein a track is deleted when no measurement update has occurred on that track for a predetermined period of time.

15. The computer readable medium as claimed in claim 10, wherein a track is updated between an initiation and a deletion by a gating procedure using a gate including a width centered on a predicted track position, the gate width being based on an estimated error for that track.

16. The computer readable medium as claimed in claim 10, further comprising:
    discriminating between multiple candidate measurements on a single track by using a nearest neighbour procedure.

17. The computer readable medium as claimed in claim 16, wherein the nearest neighbour procedure comprises forming an assignment matrix, and applying to the assignment matrix a suboptimal solution, comprising:
    searching the assignment matrix for the closest (minimum distance) measurement-to-track pair and make the indicated assignment, resulting in a reduced matrix;
    removing the measurement-to-track pair identified above from the assignment matrix; and
    searching the reduced matrix for the closest (minimum distance) measurement-to-track pair and make the indicated assignment.

18. A pulse-echo measurement system, comprising:
    a signal processing circuit configured to discriminate against false echoes caused by obstructions, wherein the signal processing circuit
    forms tracks of multiple received echoes,
    uses a recursive filter to monitor each track by estimating a track velocity and predicts the position of the next echo, and
    selects one echo from the multiple echoes received at any given time by selecting the echo on that track which has a non-null velocity and is closest to a transmitter of an interrogating pulse causing the received echoes.

19. The pulse-echo measurement system as claimed in claim 18, wherein, when all tracks have a null velocity, the track closest to the transmitter is selected.

20. The pulse-echo measurement system as claimed in claim 18, further comprising:

a computer readable medium storing a computer program code for enabling the signal processing circuit to perform a discrimination against false echoes caused by obstructions.

* * * * *